United States Patent
Bailey et al.

(10) Patent No.: US 7,584,435 B2
(45) Date of Patent: Sep. 1, 2009

(54) WEB USAGE OVERLAYS FOR THIRD-PARTY WEB PLUG-IN CONTENT

(75) Inventors: Michael Paul Bailey, Provo, UT (US); Brett M. Error, Orem, UT (US)

(73) Assignee: Omniture, Inc., Orem, UT (US)

( * ) Notice: Subject to any disclaimer, the term of this patent is extended or adjusted under 35 U.S.C. 154(b) by 459 days.

(21) Appl. No.: 11/341,231

(22) Filed: Jan. 26, 2006

(65) Prior Publication Data

US 2006/0123340 A1   Jun. 8, 2006

Related U.S. Application Data

(63) Continuation-in-part of application No. 10/794,809, filed on Mar. 3, 2004, now Pat. No. 7,441,195.

(60) Provisional application No. 60/688,274, filed on Jun. 6, 2005.

(51) Int. Cl.
   *G06F 3/048* (2006.01)

(52) U.S. Cl. .................. 715/788; 707/102; 715/764; 715/781; 715/810

(58) Field of Classification Search ............. 715/781, 715/764, 788, 810, 815; 707/102
   See application file for complete search history.

(56) References Cited

U.S. PATENT DOCUMENTS

| | | | | |
|---|---|---|---|---|
| 5,001,697 | A | * | 3/1991 | Torres .................. 715/202 |
| 5,070,478 | A | * | 12/1991 | Abbott .................. 715/210 |
| 5,751,283 | A | * | 5/1998 | Smith .................. 715/798 |
| 5,760,772 | A | | 6/1998 | Austin |
| 5,796,402 | A | | 8/1998 | Ellison-Taylor |
| 5,821,931 | A | | 10/1998 | Berquist et al. |
| 5,835,087 | A | | 11/1998 | Herz et al. |
| 5,870,559 | A | | 2/1999 | Leshem et al. |
| 5,873,106 | A | * | 2/1999 | Joseph .................. 715/203 |
| 5,966,139 | A | | 10/1999 | Anupam et al. |
| 6,008,809 | A | | 12/1999 | Brooks |
| 6,026,397 | A | | 2/2000 | Sheppard |
| 6,182,097 | B1 | | 1/2001 | Hansen et al. |
| 6,188,405 | B1 | | 2/2001 | Czerwinski et al. |
| 6,215,502 | B1 | * | 4/2001 | Ferguson .................. 345/648 |
| 6,266,649 | B1 | | 7/2001 | Linden et al. |

(Continued)

FOREIGN PATENT DOCUMENTS

WO   WO 00/58866 A   10/2000

(Continued)

OTHER PUBLICATIONS

U.S. Appl. No. 10/113,808, filed Mar. 29, 2002, Wiles Jr.

(Continued)

*Primary Examiner*—Simon Ke
*Assistant Examiner*—Erik V Stitt
(74) *Attorney, Agent, or Firm*—Raubvogel Law Office

(57) ABSTRACT

Overlay reports showing user interaction with web plug-in content are generated. Dimensions of elements within plug-in resources are determined by moving the elements to various locations with an output region and noting changes in overall dimensions of the output region. Once dimensions have been determined, overlay reports are generated including color-coded regions depicting relative levels of interaction.

42 Claims, 9 Drawing Sheets

U.S. PATENT DOCUMENTS

| | | | |
|---|---|---|---|
| 6,310,631 B1 | 10/2001 | Cecco et al. | |
| 6,335,743 B1* | 1/2002 | Owings | 715/801 |
| 6,393,479 B1 | 5/2002 | Glommen et al. | |
| 6,414,677 B1 | 7/2002 | Robertson et al. | |
| 6,414,698 B1* | 7/2002 | Lovell et al. | 715/800 |
| 6,456,305 B1* | 9/2002 | Qureshi et al. | 715/800 |
| 6,473,102 B1 | 10/2002 | Rodden et al. | |
| 6,489,968 B1 | 12/2002 | Ortega et al. | |
| 6,587,128 B2* | 7/2003 | Kanevsky et al. | 715/768 |
| 6,654,036 B1 | 11/2003 | Jones | |
| 6,671,711 B1 | 12/2003 | Pirolli et al. | |
| 6,704,016 B1 | 3/2004 | Oliver et al. | |
| 6,754,873 B1 | 6/2004 | Law et al. | |
| 6,766,370 B2 | 7/2004 | Glommen et al. | |
| 6,819,345 B1* | 11/2004 | Jones et al. | 715/856 |
| 6,850,988 B1 | 2/2005 | Reed | |
| 6,862,574 B1 | 3/2005 | Srikant et al. | |
| 6,950,993 B2 | 9/2005 | Breinberg | |
| 6,963,874 B2 | 11/2005 | Kasriel et al. | |
| 6,968,511 B1 | 11/2005 | Robertson et al. | |
| 6,980,962 B1 | 12/2005 | Arganbright et al. | |
| 7,190,379 B2* | 3/2007 | Nissen | 345/660 |
| 7,216,293 B2* | 5/2007 | Kataoka et al. | 715/246 |
| 7,417,644 B2* | 8/2008 | Cooper et al. | 345/619 |
| 7,496,844 B2* | 2/2009 | Andrew | 715/210 |
| 2002/0040395 A1 | 4/2002 | Davis et al. | |
| 2002/0042750 A1 | 4/2002 | Morrison | |
| 2002/0087621 A1 | 7/2002 | Hendriks | |
| 2002/0091591 A1 | 7/2002 | Tsumura et al. | |
| 2002/0093529 A1 | 7/2002 | Daoud et al. | |
| 2002/0099812 A1 | 7/2002 | Davis et al. | |
| 2002/0152284 A1 | 10/2002 | Cambray et al. | |
| 2002/0165936 A1 | 11/2002 | Alston et al. | |
| 2002/0186237 A1 | 12/2002 | Bradley et al. | |
| 2002/0186253 A1 | 12/2002 | Rodden et al. | |
| 2002/0198939 A1* | 12/2002 | Lee et al. | 709/203 |
| 2003/0005134 A1* | 1/2003 | Martin et al. | 709/229 |
| 2003/0023712 A1 | 1/2003 | Zhao et al. | |
| 2003/0025737 A1 | 2/2003 | Breinberg | |
| 2003/0055883 A1 | 3/2003 | Wiles, Jr. | |
| 2003/0128231 A1 | 7/2003 | Kasriel et al. | |
| 2003/0131097 A1 | 7/2003 | Kasriel et al. | |
| 2004/0049417 A1 | 3/2004 | Nickerson et al. | |
| 2004/0133671 A1 | 7/2004 | Taniguchi | |
| 2004/0205157 A1 | 10/2004 | Bibelnieks et al. | |
| 2005/0044508 A1 | 2/2005 | Stockton | |
| 2005/0108656 A1* | 5/2005 | Wu et al. | 715/801 |
| 2005/0204307 A1 | 9/2005 | Nadal | |
| 2005/0229110 A1 | 10/2005 | Gegner et al. | |
| 2005/0235222 A1 | 10/2005 | Barbanson et al. | |
| 2005/0273727 A1 | 12/2005 | Barbanson et al. | |
| 2008/0130525 A1* | 6/2008 | Jansen et al. | 370/260 |

FOREIGN PATENT DOCUMENTS

| | | | |
|---|---|---|---|
| WO | WO 02/23438 A2 | 3/2002 | |

OTHER PUBLICATIONS

U.S. Appl. No. 10/113,322, filed Mar. 29, 2002, Zhao et al.
U.S. Appl. No. 10/057,513, filed Jan. 25, 2002, Alston et al.
U.S. Appl. No. 09/835,112, filed Apr. 13, 2001, Cambray et al.
Hong, J. et al., "What Did They Do? Understanding Clickstreams with the WebQuilt Visualization System," WebQuilt homepage http://guir.berkeley.edu/projects/webquilt/, pp. 1-7.
Hong, J. et al., "WebQuilt: A Framework for Capturing and Visualizing the Web Experience," WebQuilt, homepage: http://guir.berkeley.edu/projects/webquilt/, May 1-5, 2001, pp. 1-8.
Notification of International Search Report and Written Opinion, PCT/US04/39253, Dec. 13, 2005, 13 pages.
Notification of International Search Report and Written Opinion, PCT/US04/06898, Feb. 9, 2005, 8 pages.
Notification of International Search Report and Written Opinion, PCT/US04/06696, Feb. 28, 2005, 9 pages.
Supplementary European Search Report, EP 04717485, Nov. 7, 2006, 3 pages.
Brumbaugh-Duncan Cheryl, The Flash Project New Riders Jul. 26, 2002, chapter 2, pp. 1-20.

* cited by examiner

WEB USAGE OVERLAYS FOR THIRD-PARTY WEB PLUG-IN CONTENT

CROSS-REFERENCE TO RELATED APPLICATIONS

The present application claims priority from U.S. Provisional patent application Ser. No. 60/688,274, for "Applying A Web Usage Overlay To Output Of Third-Party Web Plug-Ins," filed Jun. 6, 2005, the disclosure of which is incorporated herein by reference.

The present invention is a continuation-in-part of U.S. Utility patent application Ser. No. 10/794,809, for "Associating Website Clicks with Links on a Web Page," filed Mar. 3, 2004, the disclosure of which is incorporated herein by reference.

FIELD OF THE INVENTION

The present invention relates generally to tracking website usage, and more particularly to monitoring and tracking user interaction with third-party web plug-ins and related content.

BACKGROUND OF THE INVENTION

Web analytics refers to the analysis of data created by website usage. For instance, web analytics can be used to mine visitor traffic data. A variety of visitor traffic data is measured such as what browser is being used, what links on a given web page were selected, whether a product was purchase, etc. A number of web analytics tools are presently available, such as Site Catalyst version 11 from Omniture of Orem, Utah. These tools are able to capture data on website usage, and responsive to a user's request display a variety of different metrics on website usage such fallout/conversion, A/B testing, and the like.

In an on-line environment, website usage and other customer behavior may be tracked by a website server, or by another server such as a data collection server (also known as a data collector), which may be remotely located. The data collection server is notified of activity on a website so that it can monitor and track the activity. One method of achieving this notification is through the use of a request for embedded content.

Embedded content is part of a web page, such as an image, that is requested as a separate file from the file containing the web page. The separate file may be requested from the website server or from a remote server, such as a remote content server or data collection server. For example, when a user requests a web page from a website server, the website server sends the web page file to the user's client. The client, such as a web browser, then attempts to render the file as a viewable web page. However, upon rendering the web page file, the client may find a reference to a separate file located on the website server or a remote server. After the content is located and sent to the client, the client renders the separate file containing the embedded content along with the original web page.

A web beacon (also known as a web bug) is a particular type of embedded content where the content itself is irrelevant, but the request for content carries useful information. For example, a web beacon is often a transparent image having very small dimensions, such as 1 pixel by 1 pixel. This image is small enough to be invisible to the user. When a client is rendering a web page that includes a web beacon, the web beacon causes the client to send a resource request to a server such as a data collection server. The web beacon may include a script (or other code) that causes the client to include, in the resource request, additional information about the user and the user's environment. The additional information can include the data from a cookie, or other information about the client's operating environment or status. Where the server indicated by the web beacon code is a data collection server, the data collection server may, in response to the request, cause the client to set an additional cookie for identification for tracking purposes. In this manner, the web beacon request can be used to indicate to a data collection server that a particular web page is being rendered.

One method for including the request is to write the request as a static image tag in Hypertext Markup Language (HTML). The following is an example of an image tag in HTML:

<img src="http://example.com/tracker.exe?AID=14658&PID=259294&banner=0.gif" width=1 height=1 border=0>

Here, the term "ad.datacollectionserver.com" refers to the address of the data collection server.

Another common method of including the request is to use a scripting language such as JavaScript so as to cause the browser to dynamically generate a request to the data collection server. One advantage of using a script instead of a static image tag is that the script can cause the browser to perform other functions including gathering additional data and sending it along with the request. In either case, the result is a request sent to the data collection server upon the occurrence of an event, such as the loading and rendering of a web page.

Once the request has been sent to the data collection server, the data collection server can perform various types of tracking functions. For example, the data collection server can count the number of requests associated with a web page so as to monitor traffic on the web page. By counting the number of times the web beacon element has been requested from the data collection server, the server can determine the number of times a particular page was viewed. By using JavaScript to dynamically construct the request for the web beacon and encode additional information, other identifying information can be obtained for further analysis.

Other types of website usage tracking are also well known, such as for example log file analysis. In such an approach, statistical analysis is performed on server logs in order to detect and analyze website traffic and usage patterns.

One mechanism for presenting website usage and traffic data, as described in related U.S. Utility patent application Ser. No. 10/794,809, for "Associating Website Clicks with Links on a Web Page," filed Mar. 3, 2004, is to superimpose color-coded indications on a representation of a web page (or other online resource). Different colors can be used to represent different levels of activity for the various portions of the web page. For example, on-screen links that experience heavy traffic can be overlaid with one color, while links that experience less traffic can be overlaid with another color. A legend can be provided for explanatory purposes with respect to each of the colors.

For example, referring now to FIG. 2, there is shown an example of a page analysis report 201, displayed alongside an image of the web page 102 being analyzed. In one embodiment, report 201 is provided to a site administrator or owner interacting with data collection server 106.

In the example of FIG. 2, report 201 includes identification 202 of the website and web page being analyzed; report date 203; report options and settings 204; page metrics 205; and links 206 to related reports. In addition, variable levels and shades of color density are superimposed on the displayed view of web page 102, in order to visually represent the relative number of clicks each item 208 or screen region has received. Color key 207 is a legend to indicate the meaning of various superimposed colors.

It is desirable to generate web usage overlays to areas of a web page that are occupied by or rendered by web plug-ins, including plug-ins provided by a third party, so as to provide a graphical display of user behavior with respect to content provided by such plug-ins. For example, it may be desirable to display a color-coded overlay showing user interactions with various elements of an interactive Flash movie, Java applet, or the like. In order to display an overlay having visual characteristics that align with the underlying elements (for example, to color-code various user interface elements), it is necessary to ascertain the dimensions of each of the underlying elements.

What is needed, therefore, is a technique for determining the dimensions of elements within plug-in content, even when such content was provided by a third party. What is further needed is a technique for generating a web usage overlay for such plug-in content.

SUMMARY OF THE INVENTION

The present invention provides a mechanism for determining the dimensions of elements within plug-in resources (such as content and/or applications), so as to enable generation of web usage overlays for areas of a web page occupied by such plug-ins.

According to one aspect of the invention, an element within the plug-in resources is moved to one or more corners of the output region of the plug-in resource. Changes in dimensions of the output region are detected, and the dimensions of the element are calculated. The element is then restored to its original position. The information regarding changes in dimensions is generally available from third-party plug-in applications and can be readily extracted therefrom.

Once the dimensions of the element are known, an overlay can be generated that visually aligns with the plug-in resource. Thus, when the overlay is presented, color-coding and other visual features are properly positioned and sized within the overall display.

The present invention can be used for overlay generation for any type of plug-in content, such as for example a movie presentation, whether interactive or non-interactive. One example of such a movie presentation is that provided by an application such as Flash, provided by Macromedia of San Francisco, Calif. For example, it may be desirable to provide a color-coded overlay indicating related popularity and/or traffic for various interactive components (such as buttons) in a Flash movie. One skilled in the art will recognize that the techniques described herein can also be applied to other types of plug-ins, including for example QuickTime movies, Java applets, and the like.

The present invention can also be used for generating other types of usage reports, including for example hard copy output, text or graphical reports, and the like.

BRIEF DESCRIPTION OF THE DRAWINGS

The accompanying drawings illustrate several embodiments of the invention and, together with the description, serve to explain the principles of the invention.

One skilled in the art will recognize that these Figures are merely examples of the operation of the invention according to one embodiment, and that other architectures and modes of operation can be used without departing from the essential characteristics of the invention.

DETAILED DESCRIPTION OF THE EMBODIMENTS

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

For illustrative purposes, the invention is described with respect to interactive elements (such as buttons) within a plug-in resource such as content to be displayed within a web page. One example of such a plug-in resource is a content item interpreted and displayed by the Flash plug-in, available from Macromedia, Inc. of San Francisco, Calif.; the Flash plug-in works in conjunction with a conventional web browser such as Internet Explorer, available from Microsoft Corporation of Redmond, Wash. The Flash plug-in provides tools for presentation of video and interactive content within the context of a web page. One skilled in the art will recognize that the present invention can be used for determining dimensions of elements in other contexts as well, and that the present invention can be used in connection with other types of plug-in resources.

Architecture

Figure 1:
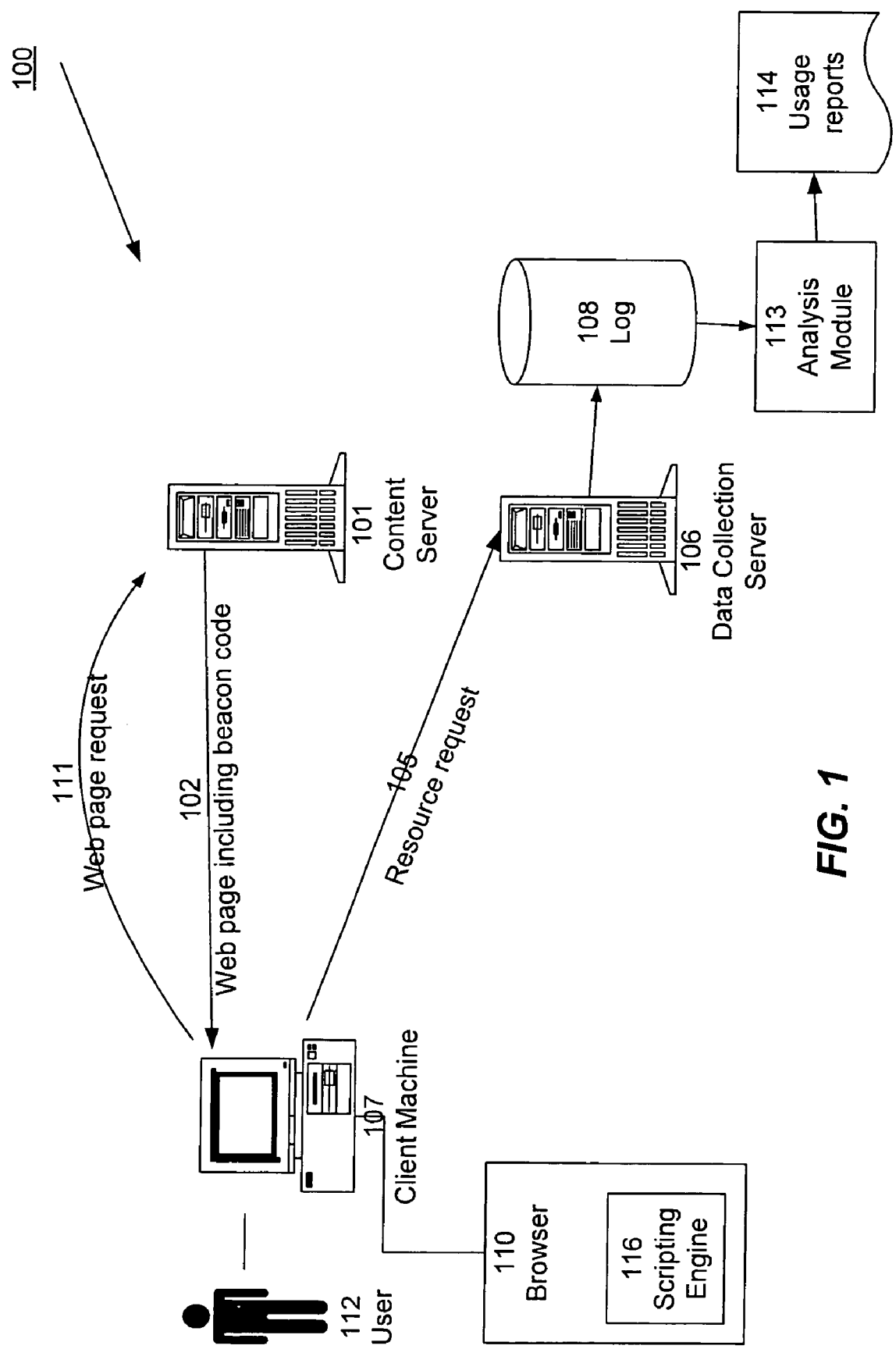
FIG. 1 is a block diagram depicting an architecture for website traffic data collection according to one embodiment of the present invention.

Referring now to FIG. 1, there is shown a block diagram depicting a system 100 for website traffic data collection according to one embodiment of the present invention. User 112 interacts with client machine 107, which runs a software application such as browser 110 for accessing and displaying web pages. Client machine 107 may be an ordinary personal computer, including well-known components such as a CPU running an operating system such as Microsoft Windows, a keyboard, mouse, display screen, and Internet connection (not shown). Client machine 107 may run various software applications in addition to browser 110. Browser 110 includes scripting engine 116, such as JavaScript, as is commonly found in commercially available browsers. In response to a user 112 action such as clicking on a link or typing in a URL, client machine 107 issues a web page request 111 that is transmitted via the Internet to content server 101. In response to request 111, content server 101 transmits web page 102 (in the form of HTML code, for example) to client machine 107. Browser 110 displays the requested web page 102 on client machine 107.

Web page 102 includes beacon code, which in one embodiment is a pointer to a beacon (such as a 1 pixel by 1 pixel transparent image). The beacon is typically invisible to the user, such as a transparent one-pixel image. For purposes of the following description, a beacon is any element that is embedded in a web page 102 which is loaded automatically by browser 110 that references an external server 106 and is used to monitor traffic. The beacon code can be provided as a script (such as a JavaScript script) to be executed by scripting engine 116. The beacon code causes client machine 107 to generate resource requests 105 to data collection server 106. These resource requests 105 are usually dynamically generated according to the script instructions. Data collection server 106 records such requests in a log 108, and can also record additional information associated with the request (such as the date and time, and possibly some identifying information that may be encoded in the resource request). Thus, tracking server 106 records the occurrence of a "hit" to web page 102. Tracking server 106 also transmits the requested one-pixel image to client machine 107 so that the resource request is satisfied.

Analysis module 113 retrieves stored tracking data from log 108, filters the data, and outputs reports 114 to a web administrator 115. Reports 114 may be provided in hard copy, or via a display screen (not shown), or by some other means. Reports 114 include, for example, overviews and statistical analyses describing the relative frequency with which various site paths are being followed through the website. Examples of such reports are described below.

Module 113 may be implemented in software running on server 106 or on another computer that can access log 108.

In one embodiment, communications between client machine 107, content server 101, and data collection server 106 are accomplished using well known network protocols, such as TCP/IP and HTTP, for communication across the Internet. Other communication methodologies and protocols can also be used.

Figure 2:
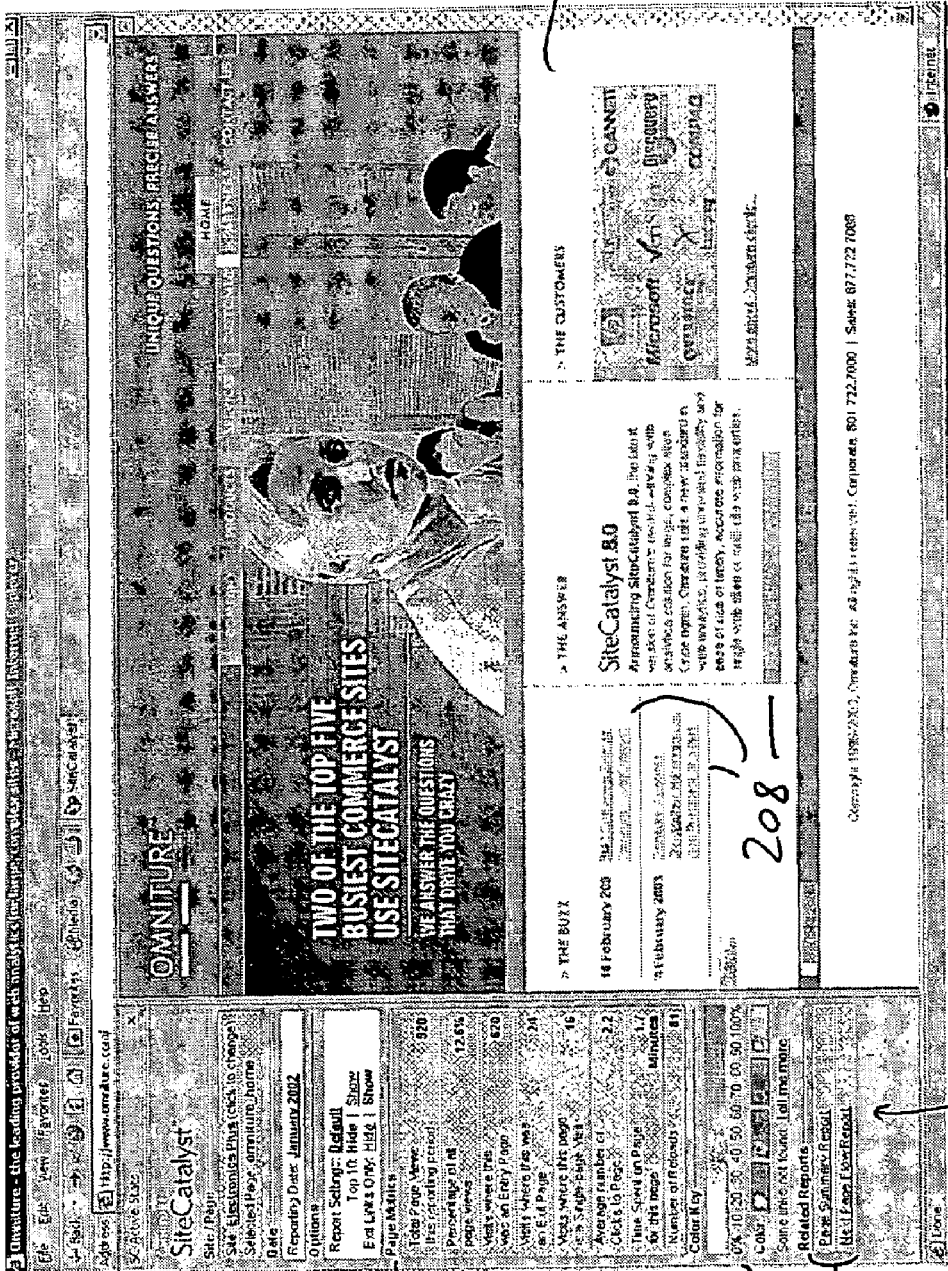
FIG. 2 is a screen shot depicting an example of a page analysis report according to one embodiment.

For example, referring now to FIG. 2, there is shown an example of a page analysis report 201, displayed alongside an image of the web page 102 being analyzed. In one embodiment, report 201 is provided to a site administrator or owner interacting with data collection server 106.

In the example of FIG. 2, report 201 includes identification 202 of the website and web page being analyzed; report date 203; report options and settings 204; page metrics 205; and links 206 to related reports. In addition, variable levels and shades of color density are superimposed on the displayed view of web page 102, in order to visually represent the relative number of clicks each item 208 or screen region has received. Color key 207 is a legend to indicate the meaning of various superimposed colors. According to the techniques described herein, an overlay report such as shown in FIG. 2 can be generated for areas of the screen occupied by plug-in content, including third-party plug-in content.

Figure 8:
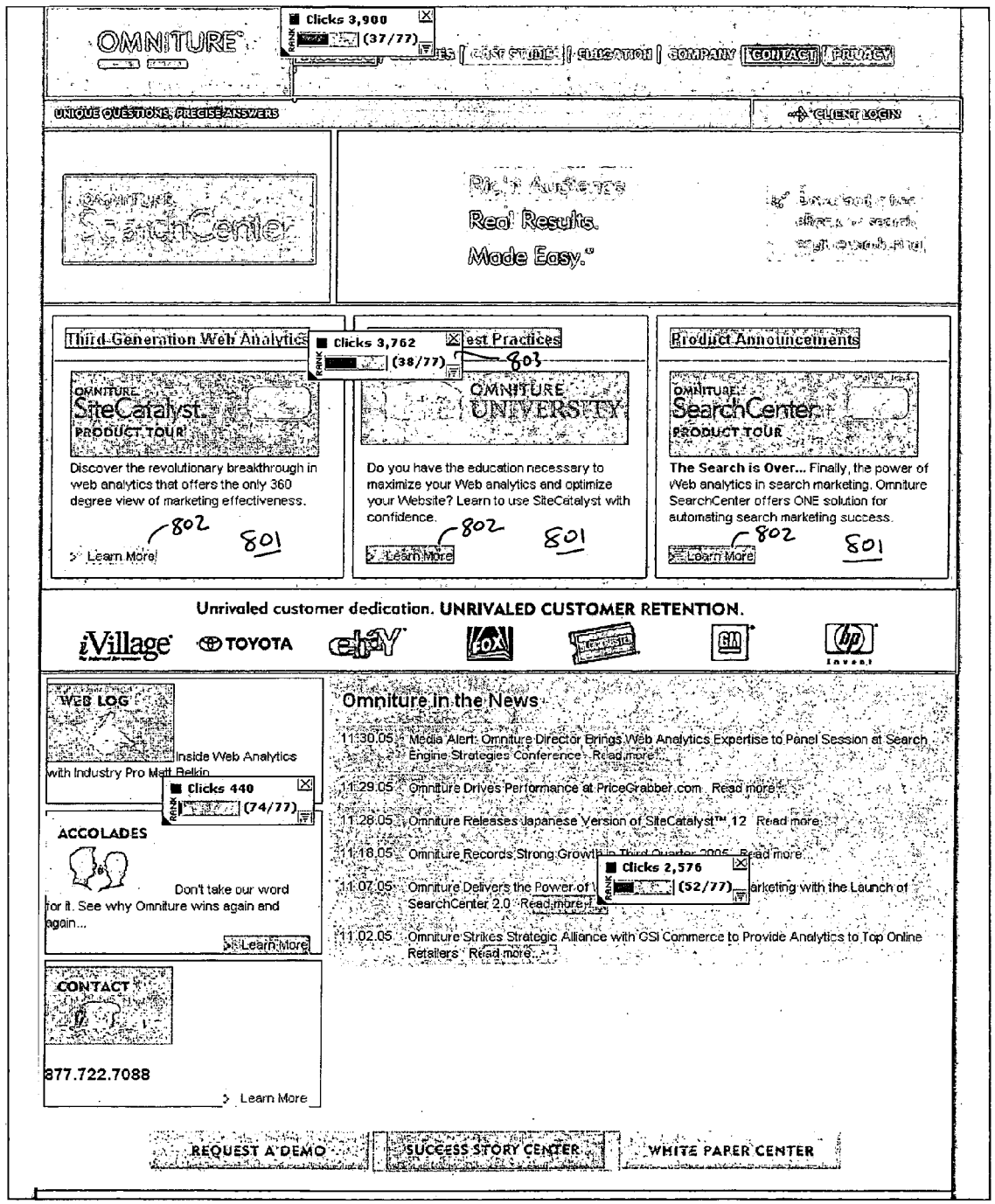
FIG. 8 is a screen shot depicting an example of an overlay report on a third-party plug-in resource.

FIG. 8 shows an example of an overlay report 800 for a web page that includes third-party plug-in content such as areas 801. In this example, areas 801 represent Flash content that occupies a portion of the web page. Certain portions 802 of content areas 801 are highlighted in different colors to denote the traffic levels. Additional information regarding web traffic is shown in overlapping windows 803.

Figure 5:
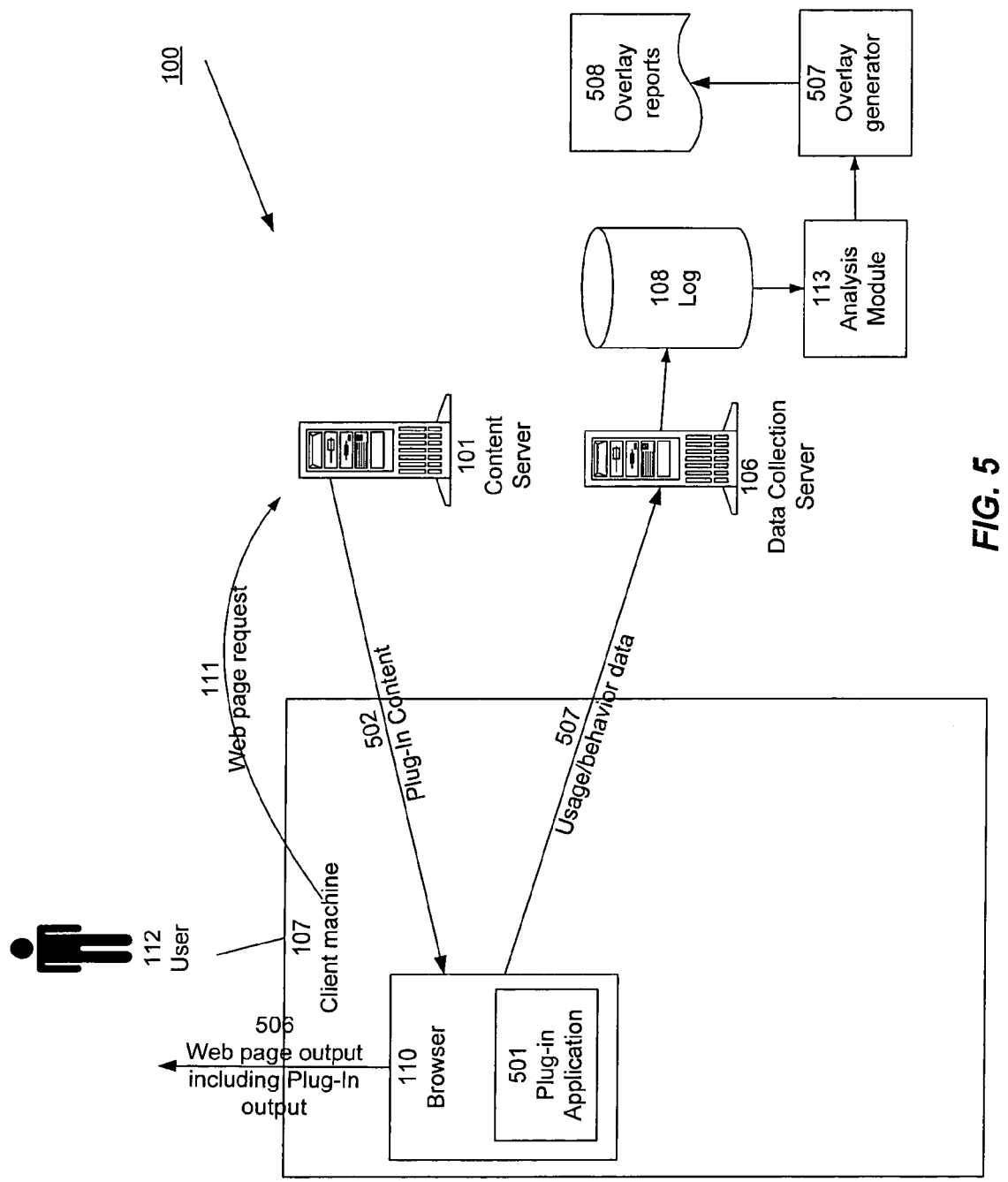
FIG. 5 is a block diagram depicting an architecture for modifying a third-party plug-in resource so as to provide usage tracking functionality according to one embodiment.
Figure 6:
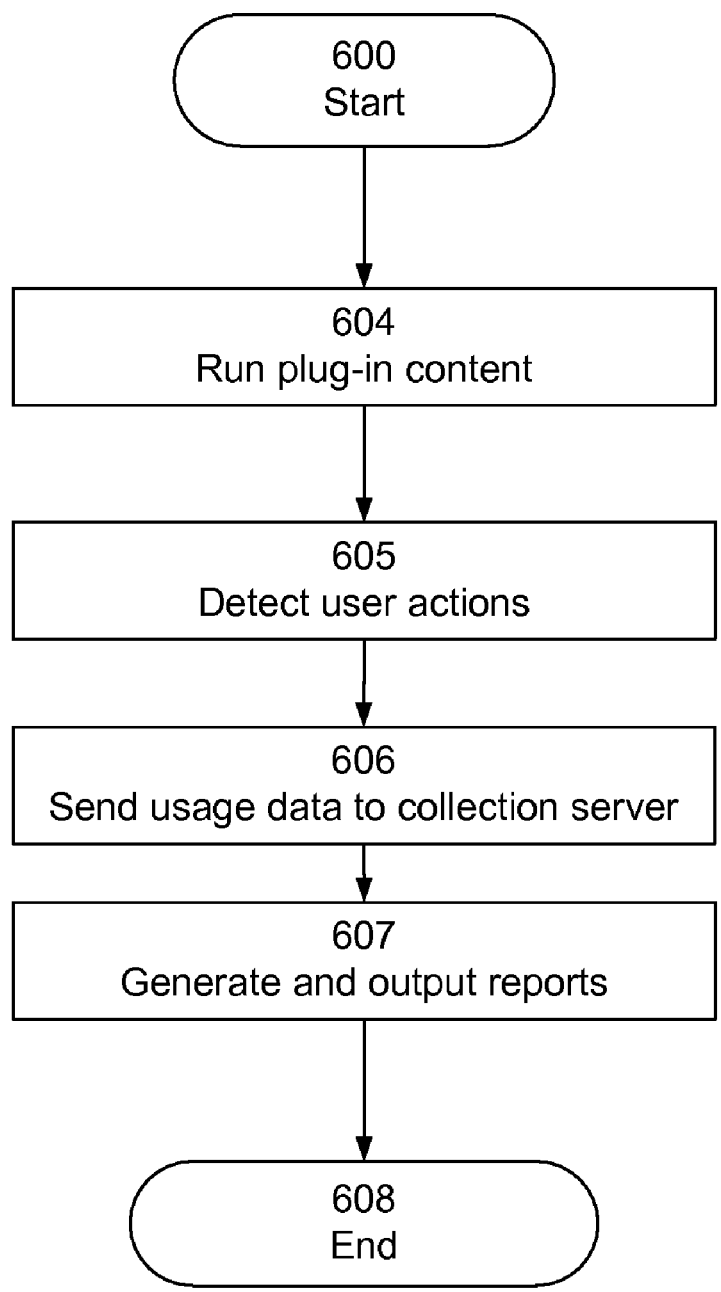
FIG. 6 is a flowchart depicting a method for modifying a third-party plug-in resource so as to provide usage tracking functionality according to one embodiment.

In order to track user interaction with plug-in content, tracking code is integrated into the plug-in code. Referring now to FIG. 6, there is shown a flowchart depicting a method for modifying a third-party plug-in resource so as to provide usage tracking functionality according to one embodiment. Referring also to FIG. 5, there is shown a block diagram depicting an architecture for modifying a third-party plug-in resource so as to provide usage tracking functionality according to one embodiment. Plug-in application 501 represents an application, such as Flash, for displaying and presenting plug-in content.

Client machine 107 sends a web page request 111 to content server 101. In response, content server 101 provides plug-in content 502 to client machine 107. In one embodiment, prior to providing content 502, content server 101 inserts tracking code. This tracking code includes code for identifying and reporting on user interaction with various elements of the plug-in resource. The tracking code replaces and/or supplements at least one method within the received plug-in content, so as to enable transmission of user behavior to a tracking component.

The method begins 600. Browser 110 runs 604 the modified plug-in content 502. Browser 110 displays web page output 506 including plug-in output. User actions with respect to tracked elements (such as a user clicking on a button or otherwise interacting with an element) are detected 605. Usage/behavior data 507 is sent 606 to data collection server 106 according to techniques described herein; the data is stored in log 108. Analysis module 113 uses the collected data is then used for generating reports 607; in one embodiment, analysis module 113 includes web overlay generation module 507 for generating overlay reports 508, which are then output. Reports 607 can thus indicate patterns of aggregate user behavior with respect to plug-in content. The method then ends 608.

Figure 7:
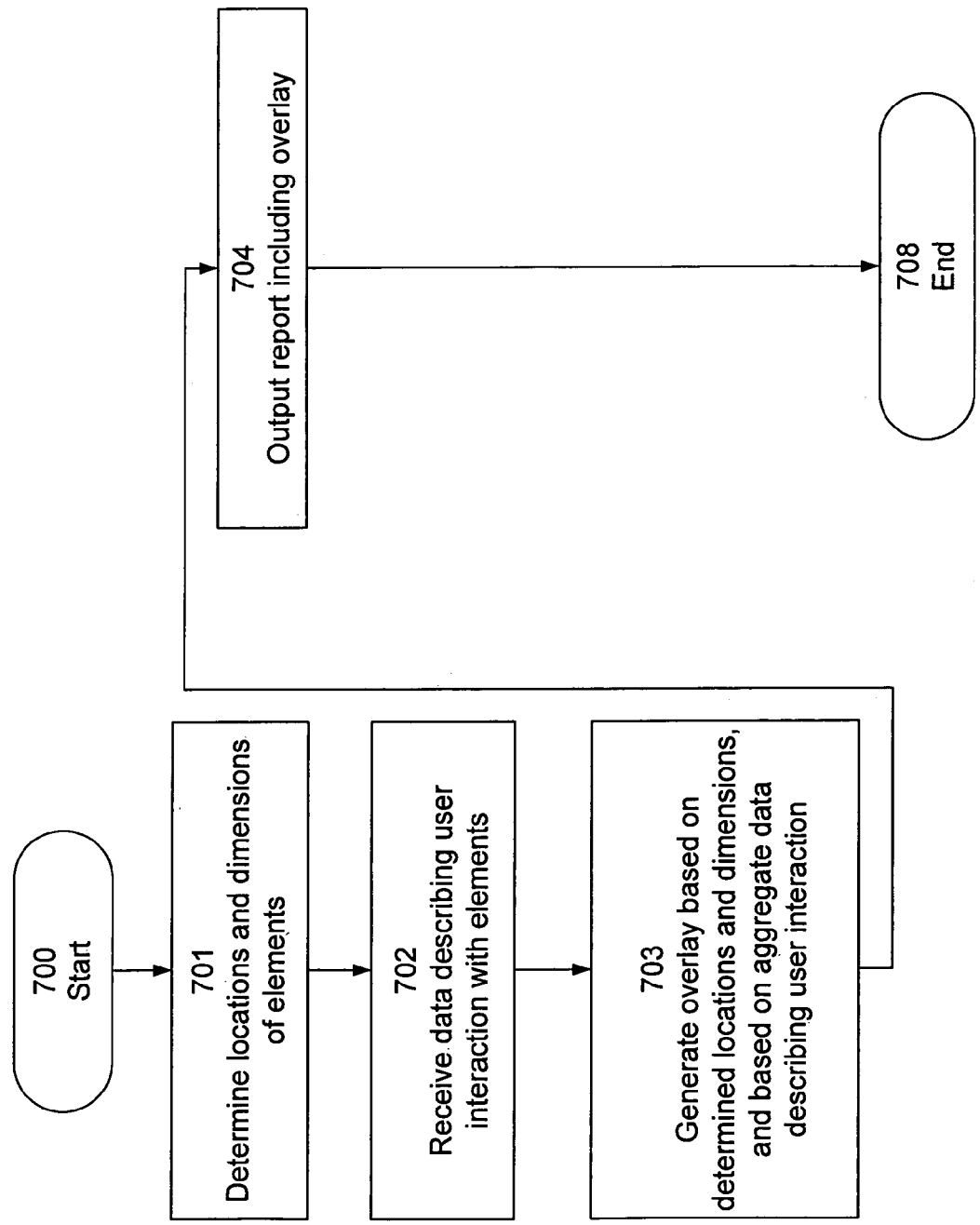
FIG. 7 is a flowchart depicting a method for generating a usage overlay for a plug-in resource, according to one embodiment.

Referring now to FIG. 7, there is shown a method for generating a usage overlay for a plug-in resource containing interactive elements, according to one embodiment. In one embodiment, analysis module 113 as shown in FIG. 1 performs the steps of FIG. 7; in other embodiments, these steps can be performed by any component of a web analysis tracking system.

The method begins 700. First, the locations and dimensions of elements are determined 701. In one embodiment, the locations (in terms of x,y coordinates) of elements are readily available, and the dimensions are determined using techniques described in more detail herein. Data describing user interaction with these elements is received 702; in one embodiment, this step involves retrieved data from log 108 containing records of user interactions. In one embodiment, this data is aggregated so that the generated report indicates overall behavior trends for a large group of users. Based on the determined locations and dimensions of elements, and based on the aggregated data describing user behavior, an overlay is generated 703. In one embodiment the overlay is a visual representation of relative levels of activity for various areas within the plug-in resource; for example, high-activity areas can be shown in one color, and lower-activity areas can be shown in a different color. Since the component generating the overlay is aware of the positions and dimensions of the elements, the positions and dimensions colored areas of the overlay can be made to match those of the elements to which they refer. The resulting report, output in step 704, shows a representation of the plug-in content, with a color-coded overlay indicating relative activity for various elements within the plug-in content. The method then ends 708.

Figure 3B:
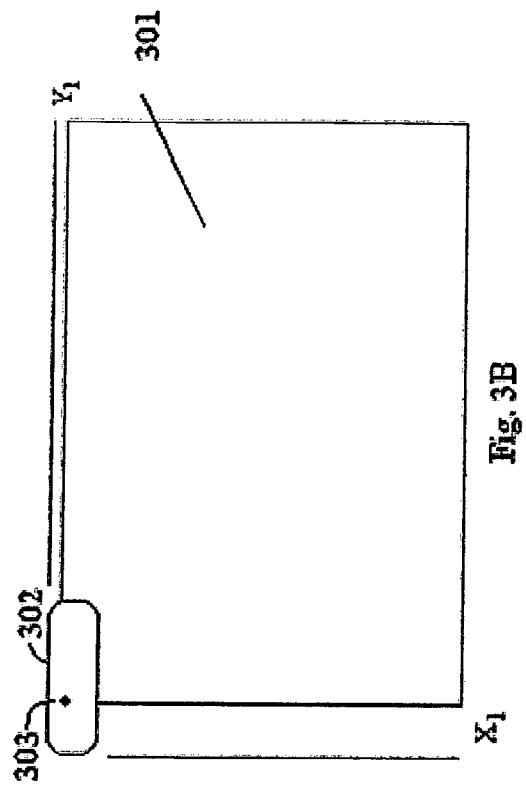
FIGS. 3A through 3D depict an example of a method for determining the dimensions of an element of a plug-in resource, according to one embodiment.
Figure 3D:
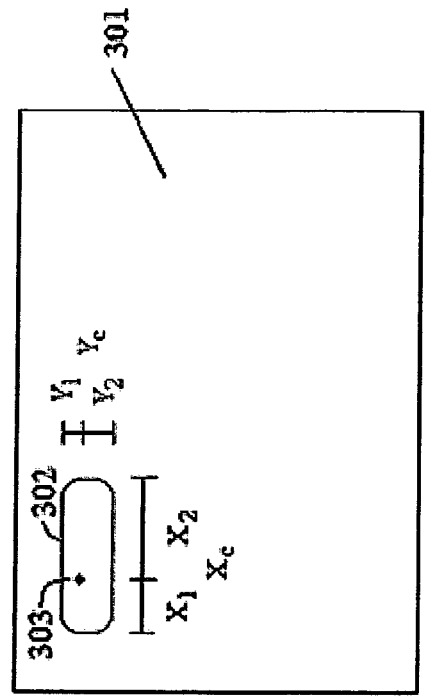
Figure 3A:
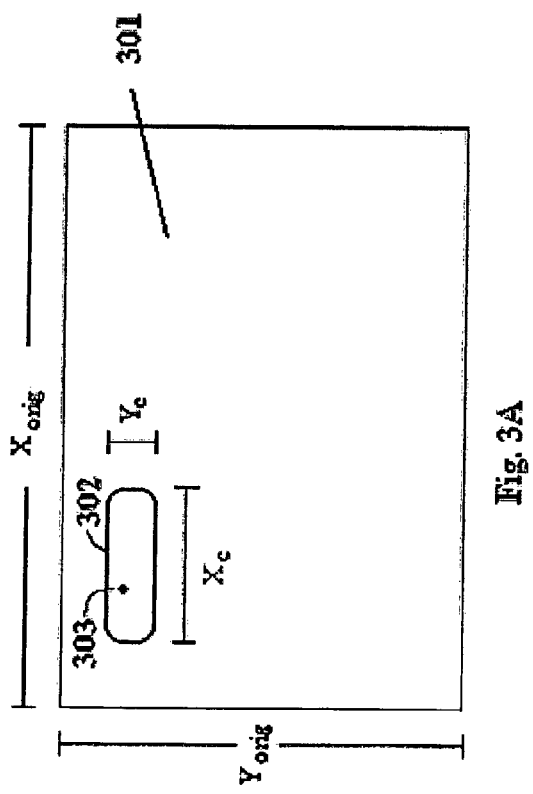
Figure 3C:
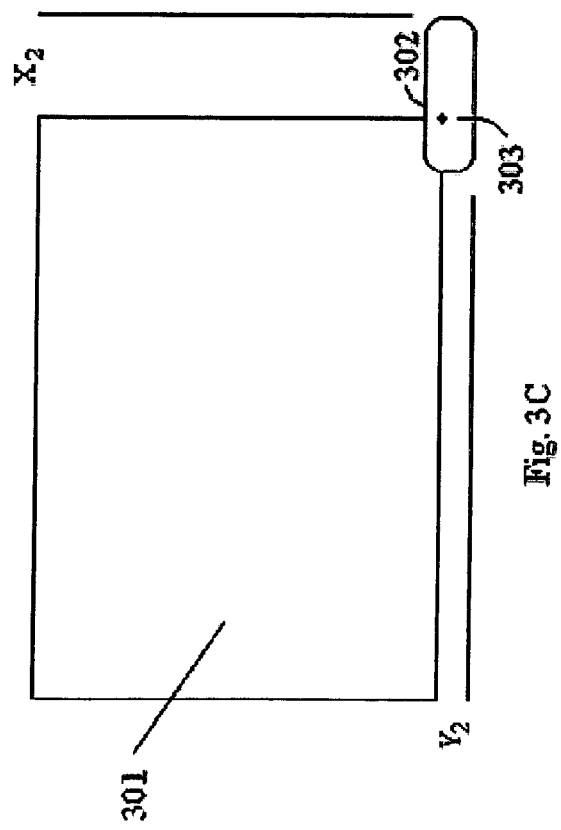
Figure 4A:
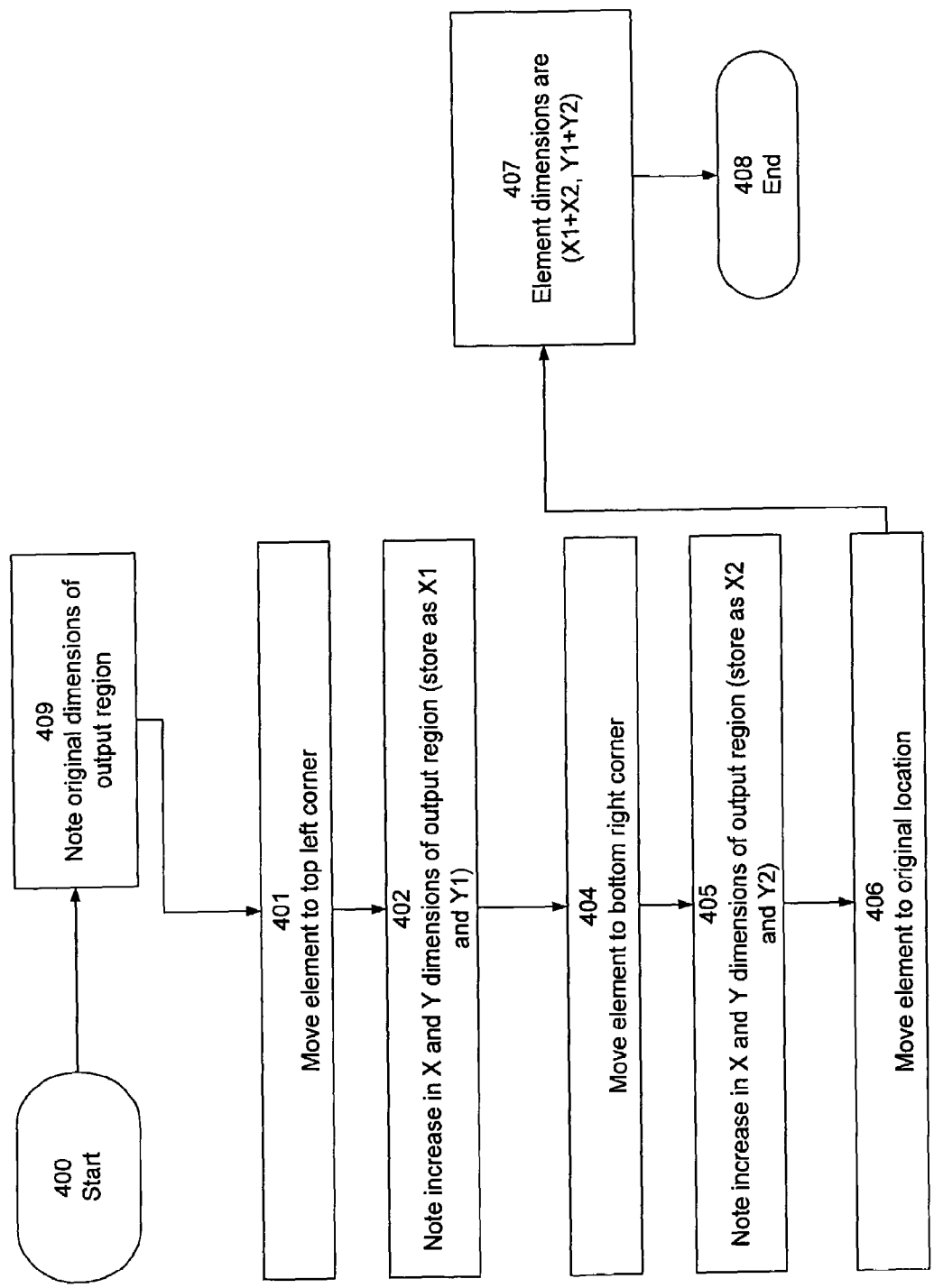
FIG. 4A is a flowchart depicting a method for determining the dimensions of a component of a plug-in resource, where the origin of the element is not necessarily in the center of the element, according to one embodiment.
Figure 4B:
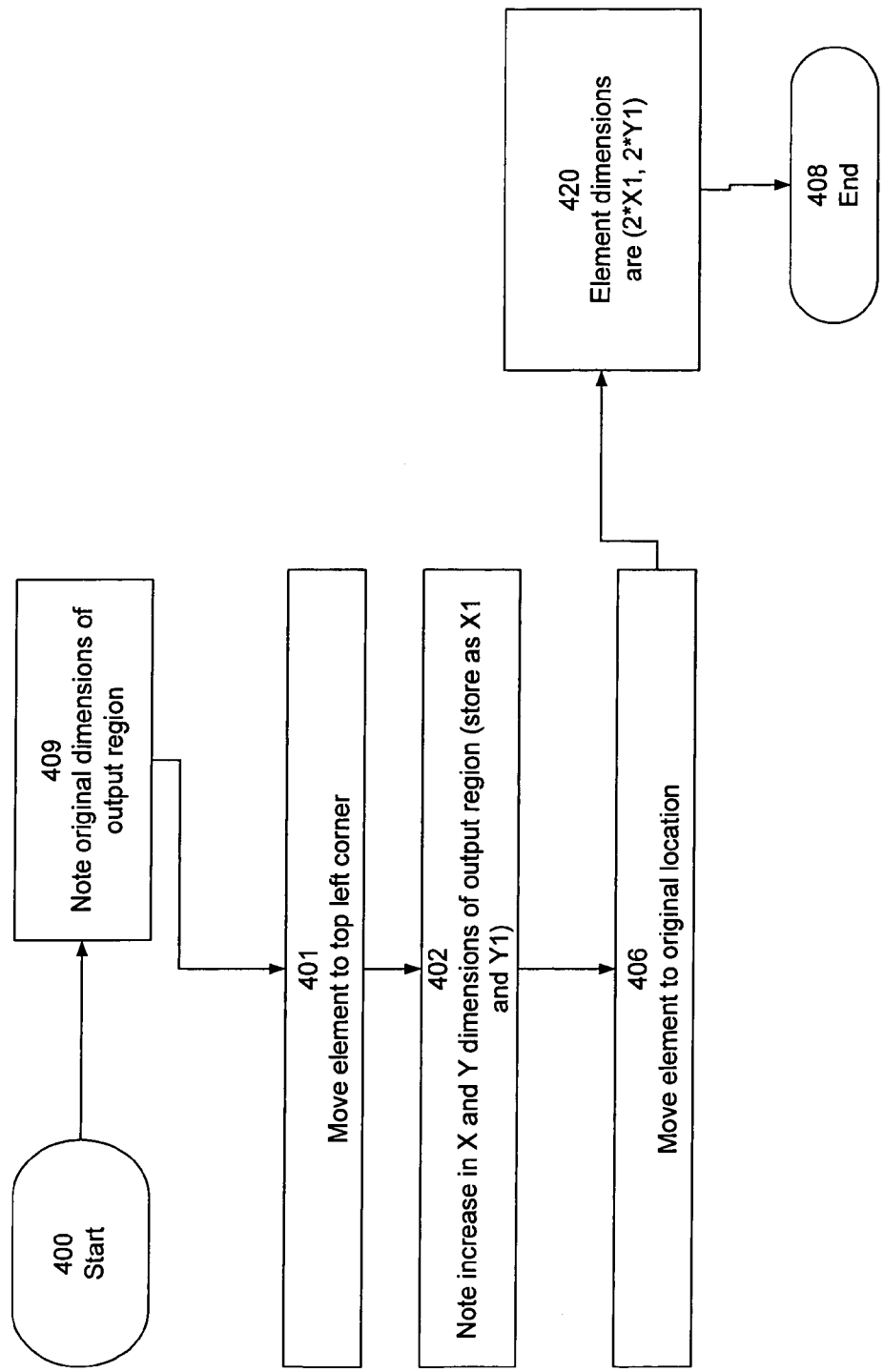
FIG. 4B is a flowchart depicting a method for determining the dimensions of a component of a plug-in resource, where the origin of the element is in the center of the element, according to one embodiment.

Referring now to FIGS. 4A and 4B, there are shown two methods for determining the dimensions of an element of a plug-in resource such as a component of a Flash movie. FIG. 4A depicts a method where the origin of the element is not necessarily in the center of the element (it may be at a corner, or at some other location). Referring also to FIGS. 3A through 3D, there is shown an example of the method. FIG. 4B depicts a method where the origin of the element is known to be in the center of the element.

Although in FIGS. 3A through 3D, the element is shown at various positions within the output region, the steps herein are performed without displaying these moved elements to the user; thus the method is done transparently without redrawing the plug-in resource. Output to the user is therefore not disrupted by the use of the method described herein.

FIG. 3A shows element 302 in its original position, with an origin point 303. $X_c$ and $Y_c$ are the unknown dimensions of element 302. Output region 301 represents an area, for example within a web page, for the display of web plug-in content.

Referring now to FIG. 4A, the method starts 400. The overall dimensions $X_{orig}, Y_{orig}$ of output region 301 are noted 409. Then, element 302 is moved 401 so that its origin point 303 is at the top left corner of output region 301 (FIG. 3B). In one embodiment, existing methods within the plug-in application are used to move element 302; for example, the Macromedia Flash plug-in contains methods that en-able movement of elements and other objects.

Many plug-in applications automatically resize their output regions to account for elements and objects that have moved beyond the original region. For example, the Macromedia Flash plug-in automatically resizes the Flash content viewing area (output region) if it detects that an element has moved outside the viewing area.

Accordingly, since origin 303 is located within element 302, movement of origin 303 to a corner causes some portion of element 302 to be located outside the original output region 301. Once the plug-in code has automatically resized output region 301, as shown in FIG. 3B, the new dimensions of the overall Flash movie 301 are compared to the original dimensions $X_{orig}, Y_{orig}$ 402. The differential in both the X and Y dimensions is stored as $X_1, Y_1$; this accounts for a first portion of the dimensions of element 302.

Next, element 302 is moved 404 so that its origin 303 is at the bot-tom right corner of output region 301 (FIG. 3C). Again, the plug-in code automatically changes the dimensions of output region 301; this difference in dimensions is noted 405 as X2, Y2. This increase in X and Y dimensions provides the other portion of the X and Y coordinates. The original size of output region 301 is restored after the increased dimensions are determined. Element 302 is then moved back 406 to its original location (FIG. 3D). Element 302 dimensions are then calculated 407 as $X_c=X_1+X_2$ and $Y_c=Y_1+Y_2$. The method then ends 408.

Once element 302 dimensions are known, an overlay can be generated according to the techniques described above, and the overlay will have the correct location and the correct dimensions.

Referring now to FIG. 4B, there is shown an embodiment where origin point 303 is known to be located at the center of element 302. Here, steps 400, 409, 401, and 402 are performed as above. However, element 302 need not be moved to a second corner; rather it is returned 406 to its original location. The values $X_1$ and $Y_1$ are each doubled 420 to provide the total X and Y dimensions of element 302. Thus $X_c=2*X_1$ and $Y_c=2*Y_1$. The method then ends 408.

One skilled in the art will recognize that the above-described technique can be applied in any situation where it is desirable to display an overlay over a portion of a web page occupied by plug-in content. This can apply, for example, to Java applets, Windows Media Player items, Quicktime movies, or the like.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

In particular, one skilled in the art will recognize that other architectures and analysis and processing techniques and mechanisms may be used, and that the present invention can be implemented using mechanisms other than those described above.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method for using a processor for determining existing dimensions of an element being displayed at an original position within a plug-in resource having a rectangular output region, the element having an origin point, the method comprising:
    moving the element so that its origin point is at a first corner of the output region;
    measuring a first increase in a horizontal dimension of the output region resulting from moving the element;
    measuring a first increase in a vertical dimension of the output region resulting from moving the element;
    moving the element so that its origin point is at a second corner of the output region, the second corner being diagonally opposite the first corner;
    measuring a second increase in a horizontal dimension of the output region resulting from moving the element;
    measuring a second increase in a vertical dimension of the output region resulting from moving the element;
    determining an existing horizontal dimension of the element as equal to the sum of the first and second measured increases in the horizontal dimension of the output region;
    determining an existing vertical dimension of the element as equal to the sum of the first and second measured increases in the vertical dimension of the output region; and
    subsequently to measuring the increases in the horizontal and vertical dimensions, restoring the element to its original position within the output region.

2. The method of claim 1, wherein the element comprises a button.

3. The method of claim 1, wherein the element comprises a user-activatable region within the output region.

4. A method for using a processor for determining existing dimensions of an element being displayed at an original position within a plug-in resource having a rectangular output region, the element having an origin point located at the center of the element, the method comprising:
    moving the element so that its origin point is at a corner of the output region;
    measuring an increase in a horizontal dimension of the output region resulting from moving the element;
    measuring an increase in a vertical dimension of the output region resulting from moving the element;
    determining an existing horizontal dimension of the element as equal to twice the measured increase in the horizontal dimension of the output region;
    determining an existing vertical dimension of the element as equal to twice the measured increase in the vertical dimension of the output region; and
    subsequently to measuring the increases in the horizontal and vertical dimensions, restoring the element to its original position within the output region.

5. The method of claim 1, wherein the origin point is not located at the center of the element.

6. The method of claim 1, wherein the plug-in resource comprises an application and the rectangular output region comprises an area within a web page.

7. The method of claim 1, wherein the plug-in resource comprises a content item for an application and the rectangular output region comprises an area within a web page.

8. The method of claim 1, wherein the plug-in resource comprises an interactive video item.

9. The method of claim 1, wherein the plug-in resource comprises video content.

10. The method of claim 1, wherein moving, measuring, determining, and restoring steps are performed responsive to receiving user input activating the element.

11. The method of claim 1, further comprising outputting the determined dimensions of the element.

12. The method of claim 1, further comprising generating and outputting a usage display using the determined dimensions of the element.

13. The method of claim 1, further comprising sending a message including the determined dimensions of the element to a software component.

14. A computer program product for determining existing dimensions of an element being displayed at an original position within a plug-in resource having a rectangular output region, the element having an origin point, the computer program product comprising:
    a computer-readable storage medium; and
    computer-readable instructions, encoded on the computer-readable storage medium, for causing a processor to:
        move the element so that its origin point is at a first corner of the output region;
        measure a first increase in a horizontal dimension of the output region resulting from moving the element;
        measure a first increase in a vertical dimension of the output region resulting from moving the element;
        move the element so that its origin point is at a second corner of the output region, the second corner being diagonally opposite the first corner;
        measure a second increase in a horizontal dimension of the output region resulting from moving the element;
        measure a second increase in a vertical dimension of the output region resulting from moving the element;
        determine an existing horizontal dimension of the element as equal to the sum of the first and second measured in creases in the horizontal dimension of the output region;
        determine an existing vertical dimension of the element as equal to the sum of the first and second measured increases in the vertical dimension of the output region; and
        subsequently to measuring the increases in the horizontal and vertical dimensions, restore the element to its original position within the output region.

15. The computer program product of claim 14, wherein the element comprises a button.

16. The computer program product of claim 14, wherein the element comprises a user-activatable region within the output region.

17. A computer program product for determining existing dimensions of an element being displayed at an original position within a plug-in resource having a rectangular output region, the element having an origin point located at the center of the element, the computer program product comprising:
a computer-readable storage medium; and
computer-readable instructions, encoded on the computer-readable storage medium, for causing a processor to:
move the element so that its origin point is at a corner of the output region;
measure an increase in a horizontal dimension of the output region resulting from moving the element;
measure an increase in a vertical dimension of the output region resulting from moving the element;
determine an existing horizontal dimension of the element as equal to twice the measured first increase in the horizontal dimension of the output region;
determine an existing vertical dimension of the element as equal to twice the measured first increase in the vertical dimension of the output; region; and
subsequently to measuring the increases in the horizontal and vertical dimensions, restore the element to its original position within the output region.

18. The computer program product of claim 14, wherein the origin point is not located at the center of the element.

19. The computer program product of claim 14, wherein the plug-in resource comprises an application and the rectangular output region comprises an area within a web page.

20. The computer program product of claim 14, wherein the plug-in resource comprises a content item for an application and the rectangular output region comprises an area within a web page.

21. The computer program product of claim 14, wherein the plug-in resource comprises an interactive video item.

22. The computer program product of claim 14, wherein the plug-in resource comprises video content.

23. The computer program product of claim 14, wherein the computer-readable instructions for causing a processor to move, measure, determine, and restore operate responsive to receiving user input activating the element.

24. The computer program product of claim 14, further comprising computer-readable instructions for causing a processor to output the determined dimensions of the element.

25. The computer program product of claim 14, further comprising computer-readable instructions for causing a processor to generate and output a usage display using the determined dimensions of the element.

26. The computer program product of claim 14, further comprising computer-readable instructions for causing a processor to send a message including the determined dimensions of the element to a software component.

27. A system for determining existing dimensions of an element being displayed at an original position within a plug-in resource having a rectangular output region, the element having an origin point, the system comprising:
a content server, comprising a processor for receiving a web page request and for providing, to a client machine, modified plug-in content, the modified plug-in content comprising code for determining dimensions of an element within a plug-in resource by:
moving the element so that its origin point is at a first corner of the output region;
measuring a first increase in a horizontal dimension of the output region resulting from moving the element;
measuring a first increase in a vertical dimension of the output region resulting from moving the element;
moving the element so that its origin point is at a second corner of the output region, the second corner being diagonally opposite the first corner;
measuring a second increase in a horizontal dimension of the output region resulting from moving the element;
measuring a second increase in a vertical dimension of the output region resulting from moving the element;
determining an existing horizontal dimension of the element as equal to the sum of the first and second measured increases in the horizontal dimension of the output region;
determining an existing vertical dimension of the element as equal to the sum of the first and second measured increases in the vertical dimension of the output region; and
subsequently to measuring the increases in the horizontal and vertical dimensions, restoring the element to its original position within the output region;
a data collection server for receiving usage data with respect to the plug-in content;
an analysis module for analyzing the received usage data; and
a report generator for generating at least one overlay report based on the analyzed usage data.

28. The system of claim 27, wherein the element comprises a button.

29. The system of claim 27, wherein the element comprises a user-activatable region within the output region.

30. The system of claim 27, wherein the plug-in resource comprises an application and the rectangular output region comprises an area within a web page.

31. The system of claim 27, wherein the plug-in resource comprises a content item for an application and the rectangular output region comprises an area within a web page.

32. The system of claim 27, wherein the plug-in resource comprises an interactive video item.

33. The system of claim 27, wherein the plug-in resource comprises video content.

34. The system of claim 27, wherein the code causes the moving, measuring, determining, and restoring steps to be performed responsive to receiving user input activating the element.

35. The system of claim 27, wherein the overlay report comprises a usage display using the determined dimensions of the element.

36. A system for determining existing dimensions of an element being displayed at an original position within a plug-in resource having a rectangular output region, the element having an origin point, the system comprising:
a content server, comprising a processor for receiving a web page request and for providing, to a client machine, modified plug-in content the modified plug-in content comprising code for determining dimensions of an element within a plug-in resource by:
moving the element so that its origin point is at a corner of the output region;
measuring an increase in a horizontal dimension of the output region resulting from moving the element;
measuring an increase in a vertical dimension of the output region resulting from moving the element;
determining an existing horizontal dimension of the element as equal to twice the measured increase in the horizontal dimension of the output region;
determining an existing vertical dimension of the element as equal to twice the measured increase in the vertical dimension of the output region; and
subsequently to measuring the increases in the horizontal and vertical dimensions, restoring the element to its original position within the output region;

a data collection server for receiving usage data with respect to the plug-in content;

an analysis module for analyzing the received usage data; and a report generator for generating at least one overlay report based on the analyzed usage data.

37. The method of claim 1, further comprising:

generating a report indicating usage statistics for at least one element of the plug-in report by superimposing at least one visual indicator quantifying user activations of a corresponding element, wherein the visual indicator has a size based on the determined horizontal and vertical dimensions of the element.

38. The method of claim 37, wherein each visual indicator is color-coded.

39. The computer program product of claim 14, further comprising computer-readable instructions for causing a processor to:

generate a report indicating usage statistics for at least one element of the plug-in report by superimposing at least one visual indicator quantifying user activations of a corresponding element, wherein the visual indicator has a size based on the determined horizontal and vertical dimensions of the element.

40. The computer program product of claim 39, wherein each visual indicator is color-coded.

41. The system of claim 27, wherein the report generator generates at least one overlay report indicating usage statistics for at least one element of the plug-in report by superimposing at least one visual indicator quantifying user activations of a corresponding element, wherein the visual indicator has a size based on the determined horizontal and vertical dimensions of the element.

42. The system of claim 41, wherein each visual indicator is color-coded.

* * * * *